June 19, 1945.  D. E. BENCH ET AL  2,378,532
INDICATING MECHANISM FOR LIQUID DISPENSING DEVICES
Filed March 29, 1940  4 Sheets-Sheet 1
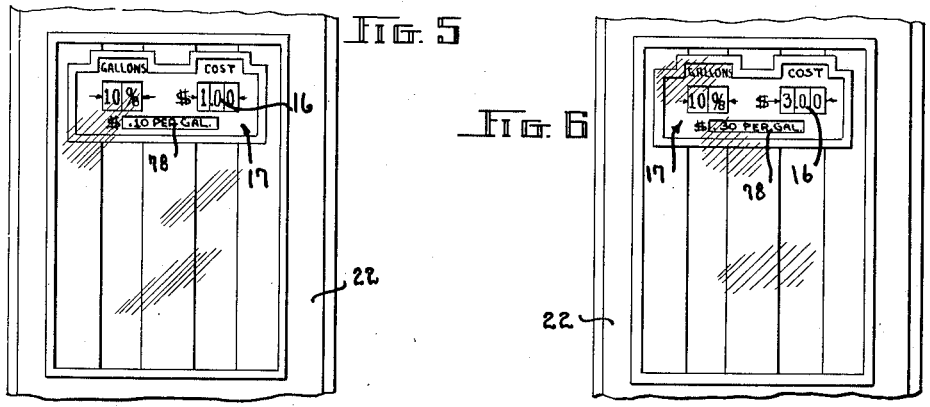
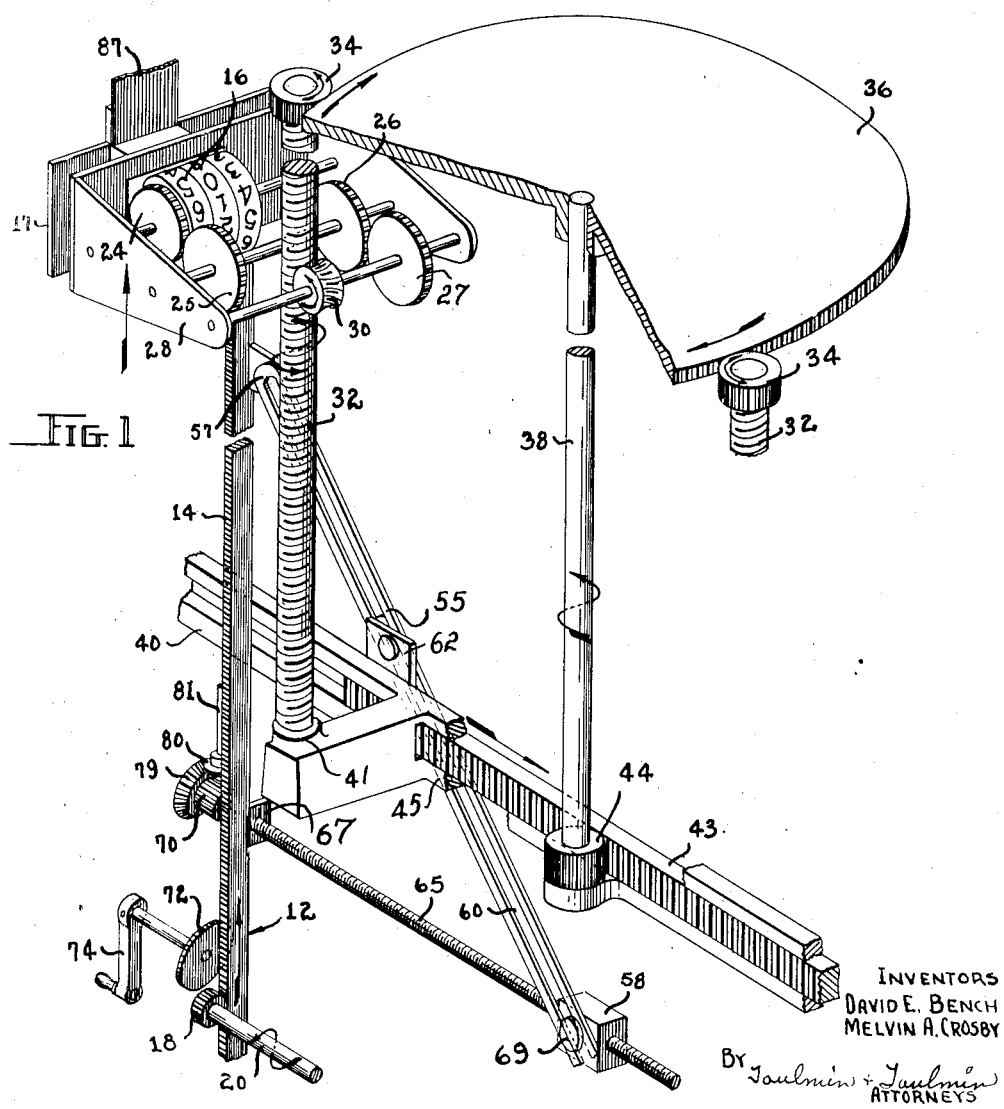
INVENTORS
DAVID E. BENCH
MELVIN A. CROSBY
BY Toulmin & Toulmin
ATTORNEYS

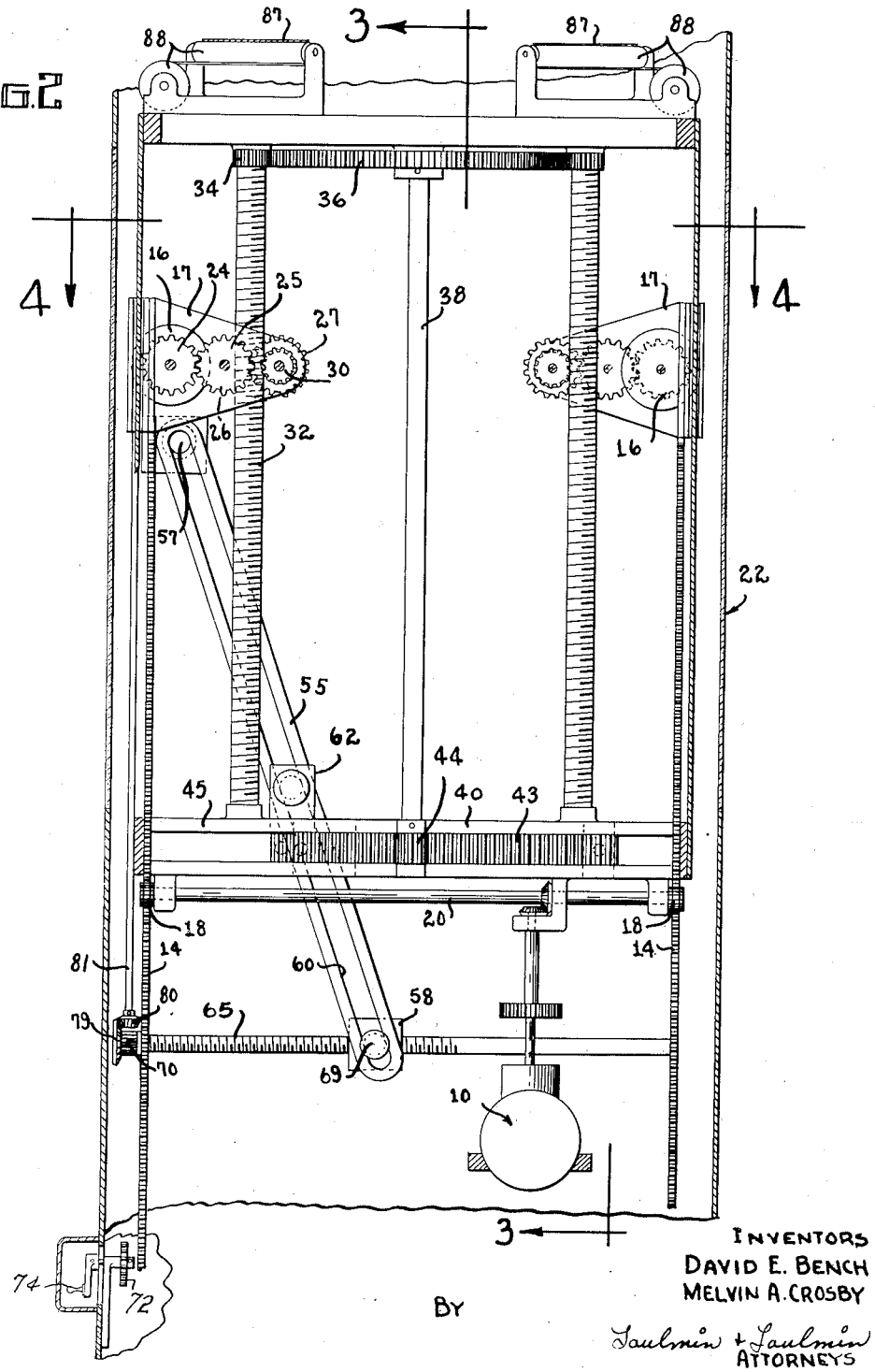

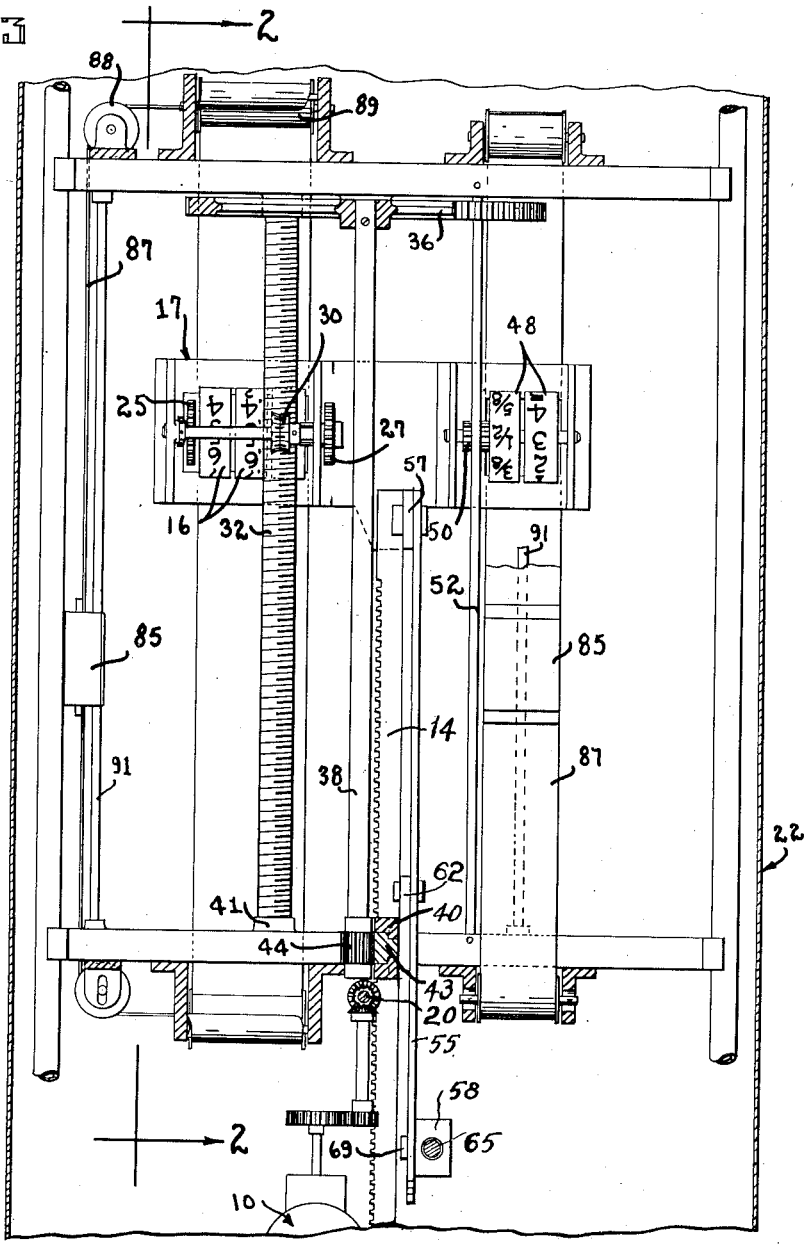

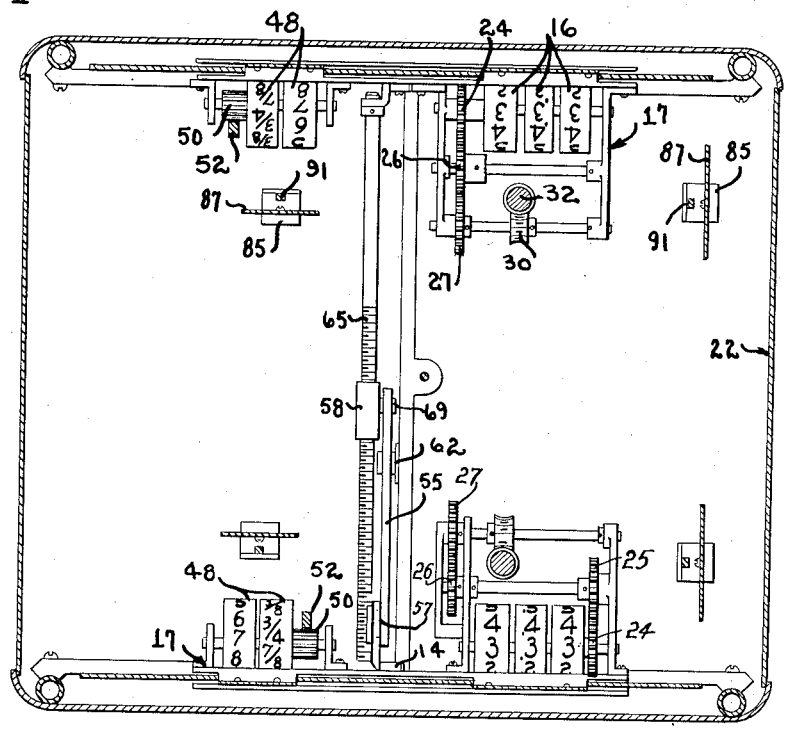
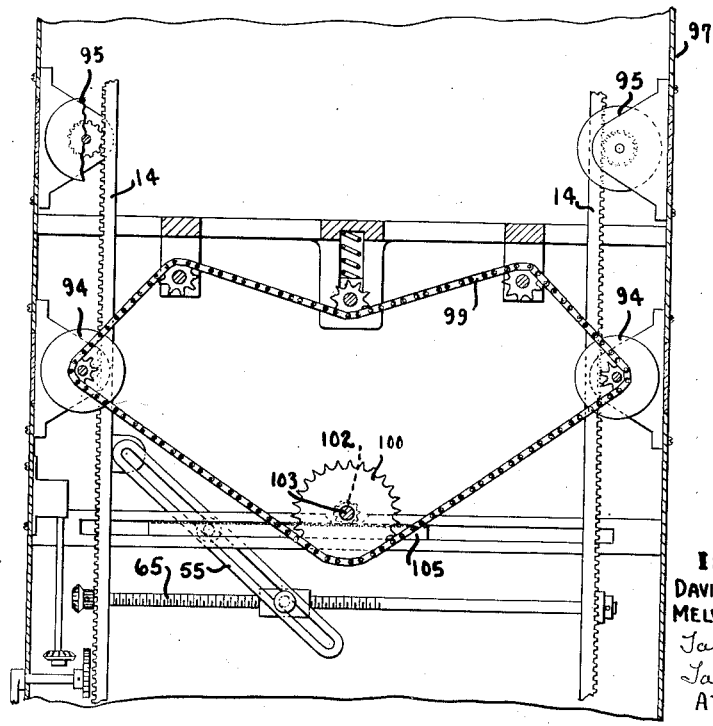

Patented June 19, 1945

2,378,532

UNITED STATES PATENT OFFICE 2,378,532

INDICATING MECHANISM FOR LIQUID DISPENSING DEVICES

David E. Bench and Melvin A. Crosby, Dayton, Ohio, assignors to The Dayton Pump and Manufacturing Company, Dayton, Ohio, a corporation of Ohio Application March 29, 1940, Serial No. 326,754

2 Claims. (Cl. 235—61)

This invention relates broadly to liquid dispensing devices and more particularly to gasoline dispensing apparatus of the money value computing type. The invention is applicable to any fluid dispensing device having means movable in proportion to the amount of fluid dispensed and is illustrated and described for convenience as applied to a gasoline dispensing apparatus which is used in dealing out gasoline and other fuels at motor vehicle service stations.

It is an object of this invention to devise an improved liquid dispensing device of simplified construction which accurately indicates the amount of liquid dispensed and computes the sale price thereof, displaying the same on a visible dial.

Another object is to provide a liquid dispensing apparatus including a liquid metering means which is arranged to actuate a price computing mechanism having a cost-indicating counter means driven by a variator comprising a lead screw and adjustable inclined plane.

Another object is to devise an improved price computing mechanism for coacting with a meter driven member to indicate exact unit quantities of liquid dispensed together with the price of the total amount of liquid dispensed.

Another object resides in providing a price computer mechanism for liquid dispensing apparatus comprising a cost price display counter mechanism of the usual type wherein the rotational speed of the numeral wheels is controlled by a lead screw which is rotated by means of a rack and gear mechanism.

Another object is to provide an improved indicating device for visibly displaying the amount of liquid dispensed, price per unit quantity, and total computed price of the liquid dealt out at any one time. The computing mechanism is provided with an inclined plane member cooperating with a rack and gear means for rotating a lead screw whereby the computing device is made to compute at the current price per unit quantity of the liquid dispensed by adjusting the angular setting of the inclined plane member.

It is a further object of this invention to provide an improved fluid dispensing device which is economical to manufacture, simple in construction and durable in use.

A further object is to provide a price computing and gallonage indicating mechanism which is readily adjustable to take care of variations in price per gallon of the liquid dispensed without interchanging any parts.

Another object resides in providing an improved money value computing mechanism for liquid dispensing pumps which is easily adjusted when the sale price of the liquid being sold changes. The computing device of this invention is infinitely variable between a predetermined price per gallon range, and the mechanism can be adjusted to compute small fractional unit changes by merely turning a crank to set the variable inclined plane at the proper angle. In this way the mechanism can be adjusted to compute at the new price per gallon without exchanging or disconnecting the device.

These and other objects will become more apparent from the following description taken in connection with the accompanying drawings showing a preferred embodiment of this invention, in which Figure 1 is a diagrammatic perspective view of the price computing mechanism of this invention; certain parts are broken away to show more distinctly the construction and cooperation between the different elements of the device.

Figure 2 is a vertical sectional view of the device, partly broken away, taken substantially on line 2—2 of Figure 3 and looking in the direction of the arrows.

Figure 3 is a similar vertical sectional view taken substantially on line 3—3 of Figure 2 and looking in the direction of the arrows.

Figure 4 is a longitudinal section view taken on the line 4—4 of Figure 2 viewed in the direction of the arrows.

Figures 5 and 6 are fragmentary views in elevation of the liquid dispensing apparatus showing the arrangement of the movable dial member for visibly indicating the gallonage of liquid dispensed, price per gallon, and computed sale price of the liquid dispensed. Figure 5 shows the computation on the basis of ten cents per gallon and Figure 6 shows a similar computation at the rate of thirty cents per gallon.

Figure 7 is a vertical sectional view partly broken away, illustrating a modification wherein an endless chain is utilized for rotating the cost price indicator drums, the drums in this modification being maintained stationary.

In general, the invention as illustrated is applicable to any fluid dispensing device such as that disclosed in the copending application of Eickmeyer et al. 283,530, filed June 10, 1939. The simplified computing mechanism of this invention eliminates the use of replaceable charts, gears, and the like machine parts forming the computing mechanism and provides a simple means for adjusting the mechanism so as to take care of the current price changes of the liquid dispensed. Heretofore, in mechanisms of this character, it has been necessary, when the sale price per unit quantity of liquid changes, to either substitute a different sale price computing chart and/or exchange one or more gears in the gear train of the computing mechanism in order to make the device compute the liquid dispensed at the new price.

This invention provides a liquid dispensing machine of the money value computing type which is of improved and simplified construction which may be readily adjusted to compute the monetary values for the liquid dispensed at different rates per gallon. To this end, the price computing mechanism includes a lead screw and a variable inclined plane means which can be easily changed by the operator so as to vary the angular setting of the latter. In this way, the device is made to accurately indicate the total price of the liquid dispensed at the price indicated on a display chart which is operatively connected with the inclined plane adjusting means. This is accomplished without the necessity of exchanging any parts of the device or substituting a new price chart which forms a part of the device.

*Quantity and price computing mechanism*

Referring to the drawings in detail, there is illustrated in Figures 1 to 4, one embodiment of this invention as applied to a conventional type liquid dispensing apparatus. The apparatus includes a pump, not shown, which is connected to cause fluid to flow through a meter generally designated at 10. The meter is arranged to drive the computing mechanism through threaded rods 32, each of which serve as a combined rack and lead screw. This mechanism comprises a movable register carrier 17 within which are mounted the cost drums 16 and the quantity indicating drums 48 and to which frame rack 14 is attached. This means may comprise a box-like structure positioned at the side of the main frame and containing a series of counter drums geared together in the usual manner to indicate cost per gallon, number of gallons and total cost. This structure is adapted to move vertically along the frame in accordance with the amount of fuel which passes through the meter 10. As shown there are two structures, one at each side of the frame and both operated by the single meter 10. The meter 10 is mounted to drive a pinion 18 on shaft 20 to raise and lower the rack 14 associated with the movable register mechanism 17 and counter means 16. The structure 17 is mounted for reciprocable motion on the frame by guide ways (not shown) and having the upper end of rack 14 fixed thereto. The lower end of this rack is mounted in a slide (not shown) carried by the lower end of the frame. Similar indicator mechanism is provided on the opposite side of the dispensing device which is enclosed in the casing generally designated 22 as shown in Figures 3 and 4.

Rotation of the numeral wheels or drums 16 during raising and lowering of the movable register carrier 17 is effected by the train of gears 24, 25, 26 and 27. These gears are suitably mounted for rotation in the bracket supporting frame means 23. Gear 27 is driven by the worm wheel member 30 which is adapted to ride up and down on the lead screw 32 upon up and down movements of the indicator mechanism 17. The lead screw 32 is rotated by the pinion 34 suitably mounted at the top of the lead screw member which is in mesh with the large gear 36 keyed to the shaft 38. Lead screw 32 is rotatably mounted in a fixed bracket member 40 as shown at 41.

For driving the gear 36, there is provided a reciprocating rack 43 which rotates the pinion gear 44 fixed to the lower end of the shaft 38, as shown in Figure 1. The rack 43 is adapted to reciprocate in the stationary guide means 45 secured to the main frame as illustrated in Fig. 1. Gear 36 similarly drives a corresponding diametrically disposed lead screw 32 and associated price computer counter mechanism which is displayed in the window of the indicator at the opposite side of the device.

As shown in Figures 3 and 4, each of the movable register carriers 17 is connected to the rack 14 arranged at opposite sides of the device and is provided with unit quantity indicating drum members 48 having the whole numeral and fractional units indicia thereon for displaying the quantity of liquid dispensed during operation of the device. Rotation of the unit quantity indicating drums 48 is provided for by means of the pinion 50 and rack 52. This rack is fixedly mounted on the frame in a vertical position while the pinion 50 is rotatably mounted within the structure 17. Thus, as the latter is elevated by operation of the meter 10, the pinion 50 rolls up the rack and actuates the gallonage drums 48. Similar mechanism is arranged on the opposite side of the device to indicate the quantity of liquid dispensed as shown in Figure 4.

*Mechanism for changing the price setting mechanism*

As the current price of the liquid dispensed changes, it is necessary to reset the computing device so that it will accurately indicate the total price of the fluid delivered at the new price. Mechanism for effecting this is shown in Figure 1 wherein the inclined plane means 55 is pivoted at its upper end to the rack 14 as at 57 and its opposite end is slidably fixed to the horizontally adjustable member 58. The inclined plane 55 comprises a central groove 60 in which the follower member 62 attached to the rack 43 is adapted to move. Upon movement of the rack 14 carrying inclined plane 55, follower 62 slides within the groove 60 of the inclined plane, causing the rack 43 to move in the horizontal direction. The gear 36 is thereby rotated, which in turn causes the lead screw 32 to speed up the rotation of the drum 16 carrying the price indicia.

Adjustment of the inclined plane 55 so as to vary its angle with the rack 14 is provided for by the screw member 65 which is suitably fixed to the rack 14 by means of the bracket 67 as shown in Figure 1 and having its other end threaded into the block 58 in which is fixed the follower means 69 reciprocatable in the slot 60 of the inclined plane 55. On the opposite end of the adjusting screw 65 is fixed the pinion gear 70, the teeth of which are enmeshed with the gear 72 of the crank 74 positioned at the lower part of the device when the movable register carrier mechanism is in lower home position.

The cost per gallon indicator dial means 78 is connected to the adjusting screw member 65 through the beveled gearing 79 and 80 and shaft 81, whereby rotation of the gear 72 by the crank 74 as shown in Figure 2, indicates any change in the computing price of the liquid dispensed. The connection from shaft 81, Figures 1 and 2, to the price per gallon indicator 78 in Figures 5 and 6, is effected in any known manner and is not shown in the drawings.

Counterbalancing mechanism

For counterbalancing the weight of the indicator mechanism 17 and associated parts, so as to provide a smoothly operating mechanism, suitable weights 85 are attached to the vertically reciprocable indicator by means of the tape-like cable members 87 which pass over the guide rollers 88 and 89. The counterbalancing weights 85 are guided in their vertical movement by means of the vertically arranged guide members 91. Flexible metal tape preferably is used as the means for supporting the counterbalancing weights 85 and is adapted to cover the openings in the front of the dial faces of the device when the indicator mechanism 17 is raised and lowered during operation of the dispensing device as shown in Figures 3, 5 and 6.

In the modification shown in Figure 7, the cost price and gallonage indicating drum members 94 and 95 respectively are maintained stationary with respect to the casing 97 of the device. In this instance, rotation of the quantity indicator means 95 is effected by reciprocation of the rack 14 which is actuated by the meter as shown in Figure 1, whereas the cost price indicating mechanism 94 is driven by the endless chain means 99 which is in turn driven by the sprocket 100, corresponding to the gear 36 in the mechanism illustrated in Figure 1. Rotation of the sprocket 100 is provided for by the pinion gear 102 attached to the sprocket shaft 103, which gear is rotated by means of the reciprocatable rack 105 which is reciprocated during vertical movement of the rack 14 and inclined plane 55 similarly as in the mechanism shown in Figure 1. The associated parts comprising the adjusting means for the inclined plane are the same as shown in Figure 1 and are designated by like character references.

Operation

In the operation of the device of this invention, it will be understood that the shaft 20 is driven by the meter, which meter is operated by the fluid flowing through the meter. This rotation of the shaft, as at 20, reciprocates the rack 14, carrying the inclined plane 55, movable register carrier 17, and associated computing mechanism. Referring particularly to Figure 1, it will be observed that when the inclined plane 55 is arranged vertically, or parallel to the rack 14, no transverse motion is communicated to the rack 43 and follower 62 upon movement of the rack 14; therefore, no rotation of the lead screw 32 is effected. The gear 30, in this case, simply rolls up the lead screw as it would on a fixed rack, and the ratios of gears 30, 27, 26, 25 and 24 are such that at this zero adjustment, i. e. when the inclined plane is vertical, the pinion 30 revolves one turn per gallon of liquid delivered, and the total cost will be computed on the basis of 10¢ per gallon. If the price per gallon of the liquid dispensed is changed to, say, 19½¢ per gallon, the computing mechanism is adjusted by setting the inclined plane 55 to the proper point along the adjusting screw 65 so that when the rack 14 rises, rotation of the lead screw through the inclined plane follower 62, attached rack 43 and gear 36 is effected so as to increase the rotation of the gear 30 whereby the price computing mechanism indicates the proper cost price of the liquid dispensed at the rate of 19½¢ per gallon.

It will be appreciated that the adjustment of the inclined plane 55 by means of screw 65 will be properly calibrated so that the price shown on the dial as at 78 will correspond to the price at which the computing mechanism is set.

After the delivery of a quantity of liquid by the device, it will be reset to zero by suitable means not shown connected to the rack 14 for returning it to the position which corresponds to the zero reading. Suitable mechanism comprising a friction clutch is connected to the meter driven shaft 20 so as to permit the reverse rotation of the shaft 20 and pinion 18 whereby the rack 14 and associated mechanism can be lowered to the zero position. Such a friction clutch mechanism may be utilized as is shown in the copending application of Eickmeyer et al., mentioned above, and which forms no part of this invention.

Subsequent to a change in the price per gallon, effected by the crank 74, the price indicator drums 16 carried by the movable register carrier 17 is reset to zero before the next dispensing operation.

It will be understood that this invention is not limited to the particular embodiment illustrated in the drawings and described, but is broadly applicable to various types of fluid dispensing apparatus and that such modifications as will occur to persons skilled in the art is intended to be included in the scope of this invention.

Having thus fully described our invention, what we claim as new and desire to secure by Letters Patent is:

1. In a liquid dispensing apparatus, the combination of dial mechanism for indicating the total computed price of liquid dispensed by said apparatus, a worm gear for actuating said mechanism, a threaded rod engaging said worm gear, means for rolling the gear along said rod in order to rotate the gear in accordance with the total quantity of liquid dispensed, and in order to actuate said indicating mechanism in accordance with the minimum price per unit of the liquid dispensed, an inclined plane element operatively associated with said rod, means for displacing said plane element in accordance with the total quantity of liquid dispensed, means coacting with said element for causing rotation of said rod, and with it additional rotation of said worm gear in accordance with the price per unit quantity of the liquid in excess of said minimum price whereby the first-mentioned rotation of the gear is modified and the actuation of said dial mechanism is determined by the combined rotation of said worm gear.

2. In a liquid dispensing apparatus, the combination of dial mechanism for indicating the total computed price of liquid dispensed by said apparatus, a worm gear for actuating said mechanism, a threaded rod engaging said worm gear, means for rolling the gear along said rod in order to rotate the gear in accordance with the total quantity of liquid dispensed, and in order to actuate said indicating mechanism in accordance with a minimum price per unit of the liquid dispensed, an inclined plane element operatively associated with said rod, means for displacing said plane element in accordance with the total quantity of liquid dispensed, means coacting with said element for causing rotation of said rod, and with it additional rotation of said worm gear in accordance with the price per unit quantity of the liquid in excess of said minimum price whereby the first-mentioned rotation of the gear is modified and the actuation of said dial mechanism is determined by the combined rotation of said worm gear, and means for adjusting the angle of the inclined plane element in accordance with the changes in the price per unit quantity of the dispensed liquid whereby the rate of rotation of the threaded rod is changed to accommodate said change in unit price and the net rate of speed of the worm gear is changed to effect a corresponding change in the total computed price of the liquid.

DAVID E. BENCH.
MELVIN A. CROSBY.